United States Patent [19]
Ackley

[11] Patent Number: 6,089,603
[45] Date of Patent: Jul. 18, 2000

[54] VEHICLE STABILIZATION SYSTEM

[76] Inventor: Paul C. Ackley, Rte. 1, Box 26, Bates City, Mo. 64011

[21] Appl. No.: 09/196,015

[22] Filed: Nov. 19, 1998

[51] Int. Cl.⁷ ....................................................... B66C 5/10
[52] U.S. Cl. ..................................... 280/765.1; 280/763.1
[58] Field of Search ............................ 280/764.1, 765.1, 280/766.1, 763.1, 762

[56] References Cited

U.S. PATENT DOCUMENTS

| | | |
|---|---|---|
| 3,310,181 | 3/1967 | Symmank . |
| 3,454,251 | 7/1969 | Dye ...................................... 280/765.1 |
| 3,767,226 | 10/1973 | Stephens . |
| 3,854,750 | 12/1974 | Voehringer, Jr. . |
| 4,295,661 | 10/1981 | Maurer ................................. 280/765.1 |
| 4,315,395 | 2/1982 | Randall et al. ....................... 280/765.1 |
| 4,883,576 | 11/1989 | Gemma ................................ 280/765.1 |
| 5,026,246 | 6/1991 | Bay et al. ............................. 280/764.1 |
| 5,205,586 | 4/1993 | Tallman . |
| 5,348,330 | 9/1994 | Few . |
| 5,488,788 | 2/1996 | Durbin . |
| 5,547,220 | 8/1996 | Lagsdin . |

*Primary Examiner*—Richard M. Camby
*Attorney, Agent, or Firm*—John C. McMahon

[57] ABSTRACT

A vehicle stabilizing apparatus for use in conjunction with a mobile vehicle. The apparatus includes a pair of units each having a pair of legs that are pivotally joined to a frame at one end and are each swingable by operation of a hydraulic cylinder to a selected position to raise the vehicle. The legs are adjustable in length. Each unit also includes a pair of crossbraces for each leg. The crossbraces swing with the legs and are attached to the frame in spaced relationship to where the legs are joined to the frame to form a triangular construction that resists rocking of the vehicle from front to rear when the vehicle is raised by the apparatus.

10 Claims, 2 Drawing Sheets

VEHICLE STABILIZATION SYSTEM

BACKGROUND OF THE INVENTION

The present invention is directed to an apparatus for leveling and stabilizing various vehicles, such as recreational vehicles, in a static position on even or uneven ground.

Many types of large vehicles travel from place to place with some degree of frequency. When the vehicle is used in a static position by humans for temporary or permanent living accommodations, it is important that the vehicle be stable and not rock or sway as persons move about in the vehicle. Vehicles of this type include towed or self propelled recreational vehicles, construction trailers, mobile homes and the like.

Such vehicles are typically difficult to stabilize when resting solely on associated wheels, since the wheels and suspension system allow the vehicle to rock as persons move about in the vehicle. Such vehicles may also be located by choice or necessity on uneven ground which causes the vehicle to tilt from side to side or from front to rear.

A common apparatus used to stabilize vehicles of this type is a vehicle jack. Such jacks can be manually operated, but are often electrically driven. The major problems associated with vehicle jacks is that, while the jacks raise the vehicle and take the weight of the vehicle off the tires and springs of the suspension system, such jacks still allow for substantial side to side rocking. Such jacks also normally require the user to carry a large supply of blocks to put under the jacks and are relatively slow to operate.

There have been improvements over the use of vertically operated jacks, such as stabilizing devices that have included a set of legs that are attached to the underside of the vehicle and pivot about an axis to engage the ground and lift the vehicle. Such devices provide greater side to side stability over vehicle jacks, but are susceptible to rocking along a front to rear axis.

Furthermore, users of vehicles of this type do not always have a chance to pick out a site that is perfectly level for static positioning of the vehicle. This is especially true when the vehicle is to be deployed in a non-improved location, such as in a forest, or if the user is one of the last to find refuge in a trailer part, such that the user must set up in a bad location. In such instances the ground may be very uneven or there may be a large pothole or a large rock may be located where a foot associated with one of the arms would be preferably positioned.

SUMMARY OF THE INVENTION

A stabilizing and leveling system is provided for use by overland recreational vehicles, trailers and the like that includes a set of four hydraulically operated arms that are pivotally attached to the vehicle on the underside thereof and which can each be independently operated to pivot between a stored position and a ground engaging position by operation of hydraulic controls so as to lift the vehicle to a position wherein the suspension system of the vehicle no longer supports the vehicle and to also simultaneously level the vehicle.

Each of the arms includes at least one crossbrace that rotates with the arm and that helps the arm resist rocking movement between front and rear of the vehicle, while the arm itself resist rocking from side to side. Furthermore, each arm includes an expandable section that may be telescoped to make each arm comparatively longer or shorter, such that when the arm is varied it may advantageously be used to offset a steep slope of the ground or to avoid an obstacle such as a pothole or rock on the ground.

OBJECTS AND ADVANTAGES OF THE INVENTION

Therefore, the objects of the present invention are: to provide a stabilization and leveling apparatus for moveable vehicles that both raises the vehicle such that the springs of the vehicle do not create movement of the vehicle as persons move about within and that also levels the vehicle in a static position; to provide such an apparatus that resist both side to side and front to rear rocking; to provide such an apparatus that allows such a vehicle to be positioned on uneven ground and be easily leveled; to provide such an apparatus with pivotal arms that engage the ground and that are variable in length to allow feet associated with the arms to avoid ground obstacles such as potholes or rocks and to allow the vehicle to be positioned on ground that is substantially unlevel; to provide such an apparatus wherein the arms are moved quickly and easily from a stored configuration to a support configuration wherein the arms both level and raise the vehicle; and to provide such an apparatus which is easy to use, easy to produce and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
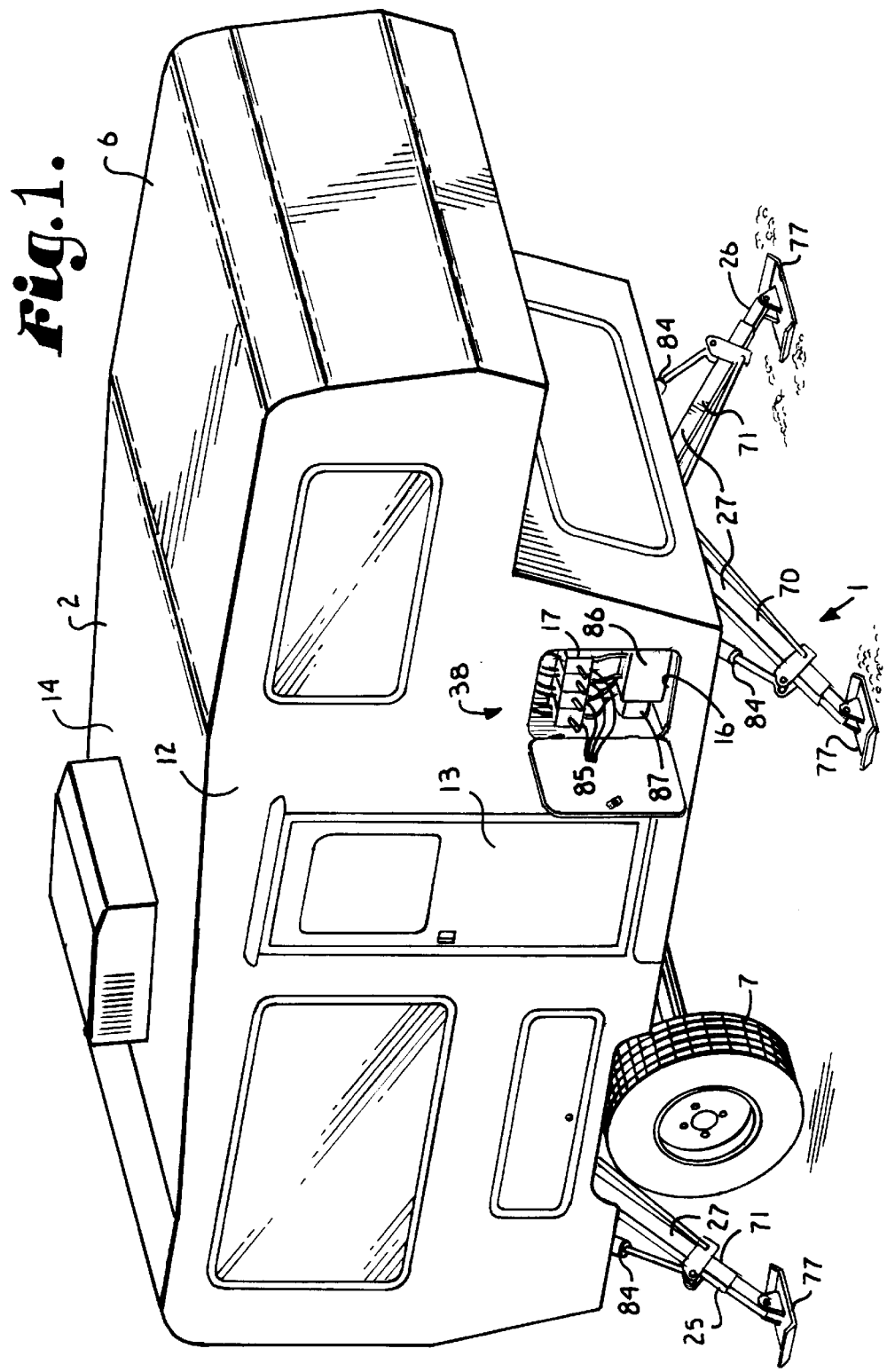
FIG. 1 is a perspective view of a mobile trailer held in a static and level configuration by a stabilizing apparatus of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a leveling and stabilization apparatus for use in conjunction with a mobile vehicle 2. The apparatus 1 has a stored configuration, as seen for the right side thereof in phantom lines in FIG. 2, wherein the apparatus 1 is drawn up into low profile against the bottom of the vehicle 2 and a supporting configuration, as seen for both sides in FIGS. 2 in solid lines and in FIG. 1, wherein the apparatus 1 raises the normally mobile vehicle 2 into a static position such that the vehicle is no longer supported by its suspension 10 and such that the vehicle 2 is level.

The vehicle 2 of the illustrations is a mobile, over the road and non self propelled recreational trailer. However, it is foreseen that the vehicle 2 may be virtually any type of vehicle of the type wherein the vehicle has an over the road suspension and wherein it is desirable to stabilize the vehicle in a static position for relatively short or long periods of time. Such vehicles may be recreational in nature, mobile homes, commercial vehicles, construction trailers or the like, any of which may be propelled by another vehicle, such as the illustrated vehicle 2 or which may be self propelled.

The vehicle 2 includes a lower floor 5, supporting an enclosure 6 surrounding an interior living or working area, a pair of wheels 7 and 8 joined by an axle 9 that supports the frame 5 during travel through the conventional suspension 10 with springs and/or shock absorbers.

The enclosure 6 includes a surrounding sidewall 12 with a door 13, a roof 14 and a recess 16 for receiving a hydraulic control panel 17 of the apparatus 1. The vehicle 2 is normally towed by another vehicle (not shown) between static locations.

The stabilization and leveling apparatus 1 includes a pair of units 25 and 26, each having a pair of legs 27, a hydraulic system 38, a stabilizing structure 39 and the hydraulic control panel 17.

Both units 25 and 26 are substantially identical and, therefore, only the frame 25 will be described in detail with the understanding that frame 26 is essentially identical. The frame 25, seen in FIGS. 2 and 3, includes an elongate center member 40 and a pair of elongate outrigger members 41 and 42.

The center member 40 is constructed of a pair of spaced rectangular tubes 44 and 45 and a plate 46 covering and attached securely by welding or the like to the tubes 44 and 45. The tubes 44 and 45 and plate 46 are aligned to be perpendicular to the major axis of travel of the vehicle 2. Near the outer ends of the plate 46, a pair of straps 48 and 49 are secured by welding or the like to the upper side of the plate 46. Each strap 48 and 49 has at least a pair of apertures 50 through which fasteners secure the center member 40 to an underside of the vehicle floor 5.

The outrigger members 41 and 42 are triangular in shape and are each parallel to, on opposite sides of and spaced from the center member 40. Each outrigger members 41 and 42 includes apertures 54 at opposite ends thereof. Fasteners secure the outrigger members 41 and 42 through the apertures 54 to the underside of the vehicle floor 5. The secure attachment of the center member 40 and outrigger members 41 and 42 effectively securely attaches each of the units 25 and 26 to the vehicle 2.

The units 25 and 26 are preferably located near opposite ends of the vehicle 2 from front to back. In some instances the units 25 and 26 will be required to be somewhat closer to the center of the vehicle 2 than is shown in structures where placement at opposite ends will create too much stress on the vehicle 2 and create difficulties such as making the door 13 hard to open or where extra ground clearance is needed for travel requiring the rear unit 25 to be positioned closer to the axle 9.

Centrally positioned along and on opposite sides of each center member 40 is a pair of spaced mounting plates 60.

Each mounting plate 60 is vertically aligned and is welded to tubes 44 and 45 respectively. Each plate 60 depends below the tubes 44 and 45. A similar set of centrally located mounting plates 61 is located along and each are welded to respective outrigger members 41 and 42.

Each of the plates 60 and 61 have a pair of spaced bores 63 that are aligned from front to rear of the vehicle 2. A pair of axles 65 and 66 are positioned through each aligned set of bores 63 and, consequently supported by both pairs of mounting plates 60 and 61.

The legs 27 include a pair with a right leg 70 and a left leg 71. Each leg 70 and 71 is pivotally mounted at one end thereof on a respective axle 65 and 66 between the mounting plates 60. Each leg 70 and 71 is elongate and pivots about an axis that runs from front to rear of the vehicle 2. Each leg 70 and 71 includes an upper section 75 and a lower section 76. Each lower section 76 is telescopingly received in a respective upper section 75 and the two sections 75 and 76 are secured together by a selective locking mechanism such as the illustrated pin 79 received in a selected one of a plurality of apertures 82 that allow for variation in the length of each leg 70 and 71. Located near a distal end of each leg 70 and 71 is a foot 77 attached by a pivot pin 78 that allows each foot 77 to freely pivot and assume the attitude of the ground upon which the foot 77 is placed.

A tab 80 is secured to and projects outwardly from each leg 70 and 71 substantially spaced from respective axles 65 and 66. A bar 81 extends between tubes 44 and 45 parallel to but also in substantial spaced relation relative to respective axles 65 and 66. A drive mechanism such as the illustrated dual acting hydraulic cylinder 84 is pivotally mounted at opposite ends thereof to a respective tab 80 and bar 81. The cylinders 84 operably control the swing of the legs 70 and 71 about the axles 65 and 66 respectively. It is foreseen that the drive mechanism could be electrically operated or the position of legs 27 could be otherwise controlled, but hydraulic cylinders are normally preferred due to speed and strength.

Each of the cylinders 84 is independently controlled by a control 85 that allows an operator to extend or reduce the length of the cylinder 84 by hydraulic action to lower or raise the distal ends of the legs 27 so as to provide for infinitely adjustable positioning of the legs 27. Hydraulic fluid for the system 88 is pressurized by a pump 86. The hydraulic controls 85 are positioned in a common location on the control panel 17 in the recess 16 so as to be easily accessed by an operator. Also associated with the recess 16 are X and Y levels 87 that allow an operator to view the level of the vehicle 2 both side to side and front to rear as the operator adjusts the legs 27 with the controls 85. The controls allow an operator to move a single leg 27 or groups of legs 27 simultaneously.

Figure 2:
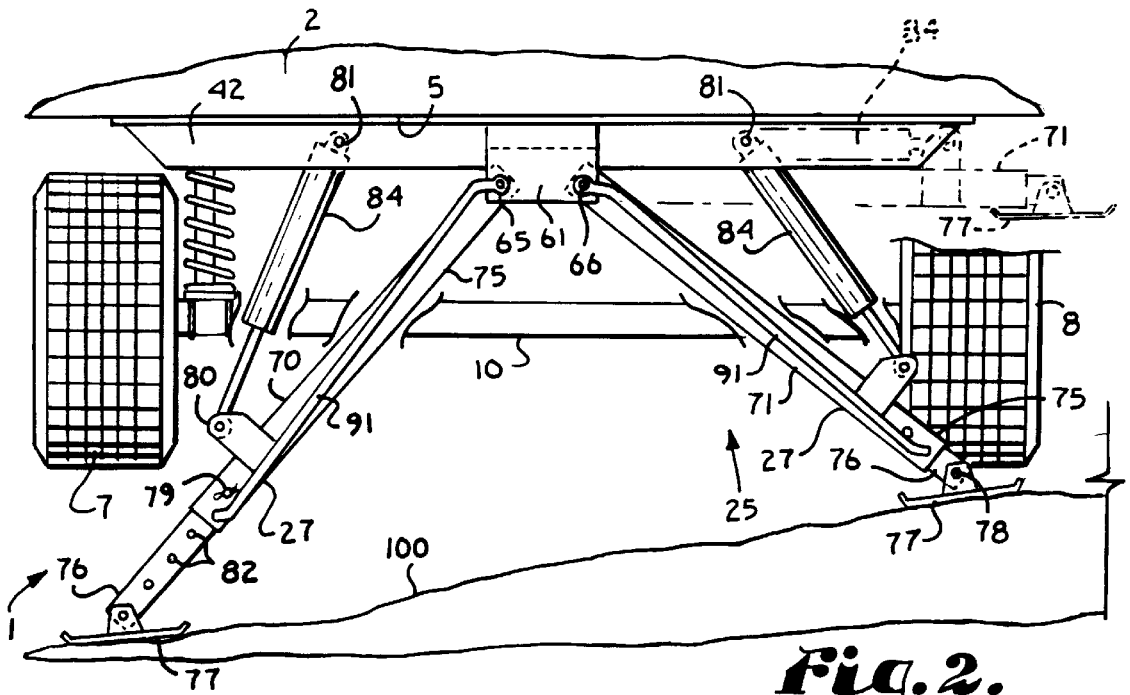
FIG. 2 is a side elevational view of a rear portion of the stabilizing apparatus and a fragmentary view of the trailer, showing arms of the stabilizing apparatus in a support configuration in solid lines and showing the right arm in a stored configuration in phantom lines with portions broken away to better illustrate detail thereof.
Figure 3:
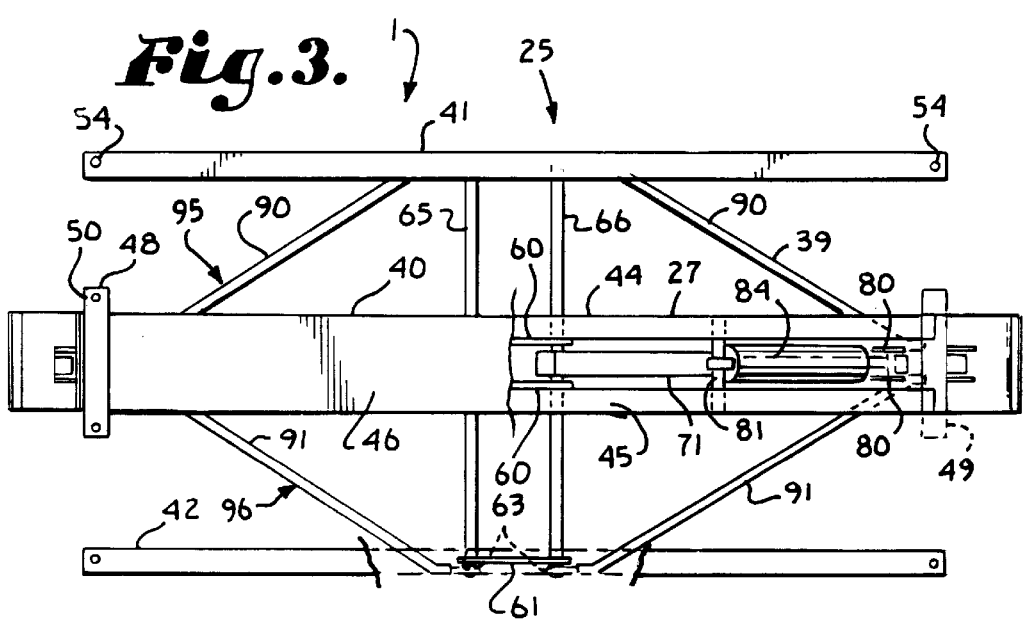
FIG. 3 is a top plan view of the rear portion of the stabilizing apparatus with portions broken away to show detail thereof.

Associated with each leg 27 is a pair of crossbraces 90. Each crossbrace 90 is joined to a respective leg 27 near a distal end thereof and also pivotally joined to a respective axle 65 or 66. The location whereat the crossbraces 90 are joined to the axles 65 and 66 respectively is positioned at the outrigger members 41 and 42 in spaced relation to the central member 40, thereby forming a triangular construction 95 between each leg 27, a respective axle 65 or 66 and the central member 40 that resist front to rear rocking of the vehicle 2, when the apparatus 1 is supporting the vehicle 2, as seen in FIGS. 1 and 2. A second similar triangular construction 96 is formed by a crossbrace 91 on the opposite side of each leg 27.

In use the vehicle 2 is positioned over a desired parking spot with the apparatus legs 27 in a raised configuration (phantom lines in FIG. 2). The operator then manipulates the controls 85 in the access recess 16 to lower the distal ends of the legs 27 until such engage the ground and then raise the vehicle 2 until the tires 7 are spaced from the ground to a static configuration (as seen in FIG. 1). The operator then adjusts the position of the legs 27 by operation of the controls 85 while watching the level 87 to level the vehicle 2 from front to rear and from side to side. The controls 85 effectively and relatively quickly operate the cylinders 84 to swing the legs 27 about the axes thereof that pass through a respective axle 65 or 66.

If the ground 100 is uneven, as in FIG. 2 or if some obstruction such as a rock or pothole is located whereat a foot 77 would otherwise engage the ground 100, the leg 27 may be telescoped to greater or shorter lengths, as needed by removal of the associated pin 79, adjustment to the desired length and then reinsertion of the pin 79 through an appropriate aperture 82. The feet 77 pivot to follow the contour of the land. The crossbraces 90 and 91 provide front to rear stability against rocking while the legs 27 brace the vehicle 2 against side to side rocking. To make the vehicle 2 mobile, the above described process is reversed.

It is to be understood that while certain forms of the present invention have been illustrated and described herein, it is not to be limited to the specific forms or arrangement of parts described and shown.

What is claimed and desired to be secured by letters patent is as follows:

1. An apparatus for operably raising a vehicle; said apparatus comprising:
   a) a frame adapted to be secured to a bottom of the vehicle;
   b) a pair of legs pivotally mounted at one end thereof to said frame such that each of said legs is adapted to rotate about an axis of rotation that extends from front to rear of said vehicle; said legs projecting in opposed directions and having a raised position and at least one lowered position wherein the legs are adapted to raise the vehicle;
   c) a drive mechanism for operably allowing an operator to selectively swing and position each of said legs about the axis of rotation thereof; and
   d) a pair of crossbraces; one of each of said crossbraces being attached to a respective one of said legs in spaced relationship to the axis of rotation of the associated leg; each of said crossbraces being pivotally attached to said frame along a respective axis of rotation in spaced relationship to whereat said legs join to said frame to form a triangular construction to resist front to rear rocking motion when said apparatus is in the lowered configuration thereof.

2. The apparatus according to claim 1 wherein said apparatus is a first unit in combination with a second unit in spaced relationship to said first unit and a mobile, wheel supported vehicle.

3. The apparatus according to claim 2 wherein each of said crossbraces is a first crossbrace relative to a respective leg and including a second crossbrace for each leg respectively; said first and second crossbraces extending laterally in opposite directions from a respective leg.

4. The apparatus according to claim 1 wherein said drive mechanism is a separate dual acting hydraulic cylinder associated with each leg respectively and having separate operator control located at a common operator access.

5. The apparatus according to claim 1 wherein:
   a) each of said legs includes an upper section and a lower section telescopingly received on said upper section and a locking mechanism to allow an operator to select and fix a variable length for each leg.

6. The apparatus according to claim 5 wherein:
   a) each of said legs includes a foot pivotally attached to a distal end of a respective leg.

7. The apparatus according to claim 1 wherein:
   a) said frame includes an elongate center member pivotally attached to each leg and at least one outrigger member positioned parallel to and in spaced relationship to said center member; each of said crossbraces being pivotally attached to an outrigger member.

8. The apparatus according to claim 1 including:
   a) a pair of axles mounted on said frame and extending laterally with respect to said legs; each of said legs and a respective crossbrace being both pivotally mounted on a respective axle at spaced locations therealong.

9. A mobile vehicle apparatus comprising:
   a) a vehicle having a body, a bottom and wheels; said vehicle being mobile when said wheels engage the ground in a mobile configuration and also having a static configuration wherein said wheels are adapted to be positioned in spaced relationship to the ground;
   b) a pair of vehicle raising units; each of said units comprising:
      1) a frame having an elongate central member and a pair of outrigger members; said outrigger members being parallel to and spaced from said center member; said frame being secured to an underside of said vehicle bottom; said center member being aligned to extend laterally with respect to the normal direction of travel of said vehicle when said vehicle is in the mobile configuration;
      2) an axle mounted on said frame and extending between said center member and said outrigger members; each of said axles being parallel and mounted near the center of the vehicle from side to side; each of said axles being aligned with the direction of travel of the vehicle when in the mobile configuration;
      3) a pair of legs; one of said legs being pivotally mounted near one end thereof on a respective axle;
      4) a hydraulic system including a dual acting hydraulic cylinder for each leg; said cylinders being operated by an operator control to allow an operator to independently swing each of said legs from a raised position through a plurality of lowered positions;
      5) first and second crossbraces associated with each leg; each of said crossbraces being attached to a respective leg in spaced relationship to a respective axle and also being attached to a respective one of said outrigger members so as to form a triangular construction between a respective leg, axle and crossbrace to resist rocking when said legs raise said vehicle to the static configuration thereof; said crossbraces extending in opposite directions from a respective leg.

10. The apparatus according to claim 9 wherein:
    a) said legs include an upper section and a lower section telescopingly received relative to said upper section and a locking mechanism to lock each leg in a selected length.

* * * * *